(12) United States Patent
Cheng et al.

(10) Patent No.: US 7,930,590 B2
(45) Date of Patent: Apr. 19, 2011

(54) METHOD AND SYSTEM FOR DIAGNOSING AN APPLICATION

(75) Inventors: Long Cheng, Beijing (CN); Ying Chen, Beijing (CN); Dong Jun Lan, Beijing (CN); Qingbo Wang, Beijing (CN); Meng Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/014,209

(22) Filed: Jan. 15, 2008

(65) Prior Publication Data

US 2008/0215922 A1 Sep. 4, 2008

(30) Foreign Application Priority Data

Jan. 16, 2007 (CN) .......................... 2007 1 0001769

(51) Int. Cl.
G06F 11/00 (2006.01)
(52) U.S. Cl. ........................................................ 714/25
(58) Field of Classification Search .................. 714/48
See application file for complete search history.

(56) References Cited

U.S. PATENT DOCUMENTS

| | | | |
|---|---|---|---|
| 6,285,363 B1 * | 9/2001 | Mairs et al. .................... | 715/751 |
| 6,393,582 B1 * | 5/2002 | Klecka et al. ................... | 714/11 |
| 6,499,113 B1 * | 12/2002 | Tobin et al. ..................... | 714/19 |
| 6,539,337 B1 | 3/2003 | Provan | |
| 6,604,177 B1 * | 8/2003 | Kondo et al. .................. | 711/150 |
| 6,691,250 B1 | 2/2004 | Chandiramani | |
| 6,766,472 B2 | 7/2004 | Hogdal | |
| 7,293,044 B2 * | 11/2007 | Ghotge et al. ........................ | 1/1 |
| 7,565,644 B2 * | 7/2009 | Johnson et al. ............... | 717/129 |
| 2004/0221269 A1 * | 11/2004 | Ray et al. ...................... | 717/124 |
| 2004/0221271 A1 * | 11/2004 | Zeman et al. ................. | 717/127 |
| 2005/0055445 A1 * | 3/2005 | Gupta et al. .................. | 709/226 |
| 2006/0041866 A1 * | 2/2006 | Sivaram ........................ | 717/124 |
| 2006/0168356 A1 * | 7/2006 | Mairs et al. ....................... | 710/1 |
| 2006/0179290 A1 * | 8/2006 | Busaba et al. ................ | 712/228 |
| 2008/0229141 A1 * | 9/2008 | Chang et al. ...................... | 714/3 |
| 2009/0183035 A1 * | 7/2009 | Butler et al. .................... | 714/48 |

* cited by examiner

Primary Examiner — Bryce P Bonzo
(74) Attorney, Agent, or Firm — William Stock; Anne Vachon Dougherty

(57) ABSTRACT

A system, method and program enabling users to diagnose applications easily without affecting the operating performance of the application server, optimizing the log mechanism based on the integrated development environment. The method includes running the application in a main running environment and at least one shadow environment, the shadow environment obtained by duplicating the main running environment; and the main running environment interacting with the shadow environment with respect to the fault of the application. The method includes performing the steps of the main running environment: monitoring the exceptions in the system and sending system exception information to the shadow environment in the event of finding exceptions in the system. The shadow environment: receives the system exception information, opens diagnostic log/trace functions to obtain diagnosis log/trace files related to the system exceptions, and analyzes the diagnosis result based on the obtained diagnosis log/trace files.

16 Claims, 4 Drawing Sheets

METHOD AND SYSTEM FOR DIAGNOSING AN APPLICATION

TECHNICAL FIELD

The present invention relates to fault diagnosis for computer programs. More specifically, the present invention relates to a method, system and computer program product for diagnosing an application with environment duplication.

BACKGROUND ART

With the rapid development of the Internet and dramatic growth of WWW applications, Java has become a popular developing and programming language on the Internet. The Java family currently includes three major members: J2ME (Java 2 Micro Edition), J2SE (Java 2 Standard Edition), and J2EE (Java 2 Enterprise Edition). The J2EE, due to its advantages including cross-platform portability, availability of open-source libraries, a huge server-side deployment base, and coverage for most W3C standards, has become very popular in enterprise application development. There are millions of J2EE applications running on J2EE application servers, and more and more J2EE applications are under development.

With the popularity of J2EE applications, the debug and problem determination has become an important issue. Several standards related to this issue have been published, such as "Java Management Extensions (JMX) specification", "Logging API Specification (JSR47)", "Monitoring and Management Specification for the Java Virtual Machine (JSR174)", etc.

The problems discovered at the time of system diagnosis, for example, can be categorized as follows:
(1) Function, or integration misbehavior;
(2) Poor performance;
(3) Crashes;
(4) Hangs;
(5) Memory leaks.

Among the five categories of problems listed above, the latter three are hard to detect. The reason is that they typically appear at high volume condition, or after a long time running. Therefore, it is typically difficult to catch enough information for problem determination. Areas where problems may arise include: JVM (Java Virtual Machine) itself, native node, Java application, system or system source, sub-system (such as database nodes), hardware, and so on.

Some information is available for problem determination in various application server environments conforming to J2EE standards, including:

JavaDump: JavaDump is produced by default when JVM terminates unexpectedly. It summarizes the state of JVM at the instant.

HeapDump: HeapDump is generated at the request of the user. The finer control of the timing of Heapdump can also be specified with Xdump:heap option.

SystemDump: System Dump is also produced by JVM. It contains information about the active process, thread and system memory, and is specified through Xdump:system option.

Trace data: Trace data includes detailed data collected by a running JVM.

Snap trace: Snap trace contains small amount of trace data a running JVM collects, and is similar to the normal trace data.

Profiling: Profiling is a high level log file, which can provide a very detailed records of the activities of the application server.

Garbage collection data: Garbage collection data is produced by JVM with verbose:gc option. It is used to analyze problems in garbage collection of user applications.

Other data available for problem determination include, for example, JIT(Just In Time) data, class loading data and shared classes, and so on.

Although the above information can be used for problem determination, the users still have the dilemma between the cost and usability. On the one hand, the application server may crash/dump unexpectedly in running, and the time cannot be speculated. To find the reason for crash is tough work. Although the system provides some basic information which can be used for problem analysis, including basic log files (e.g., SystemOut.log, etc.) and the above-mentioned dump files, the basic log files cannot provide sufficiently detailed information about the activities of the application server, and thus mere dependence upon these log files is not enough for problem determination in the event of application server crashes, and the normal dump files only contain current status at dump of the application server with no history record for its activities, and thus are not enough for problem determination, either. On the other hand, if the user opens diagnostic log/trace functions to record in detail the activities of the application server, the system performance will degrade significantly, since the enablement of these log/trace functions will occupy a large memory space and decreases the operating speed of the system significantly, and may also cause unexpected problems. In addition, too many log/trace data mean a knowledge explosion, which also makes it difficult for the user to find the problem. Therefore, in a production environment, to open such diagnostic log/trace functions is unpractical.

FIG. 1 illustrates the relationship between the usability of various means for problem determination and their costs. As can be seen from FIG. 1, those means with higher usability have higher costs, and thus are difficult to implement in a production environment.

SUMMARY OF INVENTION

The primary object of the present invention is to overcome the above-mentioned problems in the prior art and provide a method, system and computer program product which enable the users to diagnose an application easily without affecting the operating performance of the application server.

According to one aspect of the present invention, there is provided a system for diagnosing an application, comprising: diagnosis modules in a main running environment of the application; and diagnosis modules in a shadow environment (s) of the application, the shadow environment(s) being obtained by duplicating the main running environment and there being at least one shadow environment, wherein the diagnosis modules in the main running environment and the diagnosis modules in the shadow environment may interact with each other with respect to the fault of the application.

Preferably, the interaction between the diagnosis modules in the main running environment and the diagnosis modules in the shadow environment includes the exchange of system exception information.

Preferably, the diagnosis modules in the main running environment send the system exception information to the diagnosis modules in the shadow environment, and the diagnosis modules in the shadow environment, based on the system exception information, perform diagnosis on the fault of the application.

Preferably, the diagnosis modules in the main running environment include: an exception monitor for monitoring the occurrence of exceptions in the system; and an exception informer for sending system exception information to the shadow environment in the event that the exception monitor finds system exceptions; and the modules in the shadow environment include: an exception receiver for communicating with the exception informer to receive the system exception information;
a diagnosis manager-analyzer, for managing the system exception information and performing analysis on the default of the application.

Preferably, the diagnosis manager-analyzer includes: a diagnosis manager for opening diagnostic log/trace functions based on the system exception information received by the exception receiver, to obtain diagnosis log/trace files related to the system exceptions; and a diagnosis analyzer, for analyzing the diagnosis result based on the diagnosis log/trace files obtained by the diagnosis manager.

According to another aspect of the present invention, there is provided a method for diagnosing an application, wherein: the application is running in a main running environment and a shadow environment(s), the shadow environment(s) being obtained by duplicating the main running environment and there being at least one shadow environment; and the main running environment interacts with the shadow environment with respect to the fault of the application.

Preferably, the interaction includes the exchange of system exception information.

Preferably, the main running environment sends the system exception information to the shadow environment, and the shadow environment performs diagnosis on the default of the application.

Preferably, the interaction between the main running environment and the shadow environment includes: performing the following steps in the main running environment: monitoring the occurrence of exceptions in the system; and sending system exception information to the shadow environment in the event of finding system exceptions; and performing the following steps in the shadow environment: receiving from the main running environment the system exception information; and performing analysis and diagnosis on the default of the application based on the received system exception information.

Preferably, performing analysis and diagnosis on the default of the application includes: opening diagnostic log/trace functions, to obtain diagnosis log/trace files related to the system exceptions; and analyzing the diagnosis result based on the obtained diagnosis log/trace files.

According to a further aspect of the present invention, there is provided a computer program product, comprising program code which, when executed by a computer, causes the computer to perform the method for diagnosing an application according to the present invention. As compared with the existing methods for problem determination for applications, the present invention has the advantages that, when an exception occurs in the application, the system can automatically open the diagnostic log/trace functions in the "shadow environment" (or referred to as "duplicate running environment"), and thus can record the activities of the application server in detail without affecting the operating performance of the application server in the main running environment. In the case where the instance in the main running environment crashes due to fault, the detailed records of another instance in the shadow environment may be opened for diagnosing the default of the application. In addition, since only information related to the system exceptions is recorded in the shadow environment, the user can easily detect the actions in the application server and locate the reasons for the default based on the diagnosis log/trace files obtained, the work load of the application server can be reduced and recording errors on demand can be realized, thereby optimizing the log mechanism based on the integrated development environment. The present invention can be used both as a design-time tool when developing applications based on an integrated development environment, and as a run-time tool.

BRIEF DESCRIPTION OF THE DRAWINGS

From the detailed description of the preferred embodiments of the prevent invention in conjunction with the accompanying drawings, the above mentioned and other objects, features and advantages of the present invention will become more apparent. In the drawings, the same or similar reference numbers are used for the same or similar elements.

DETAILED DESCRIPTION OF THE INVENTION

Figure 1:
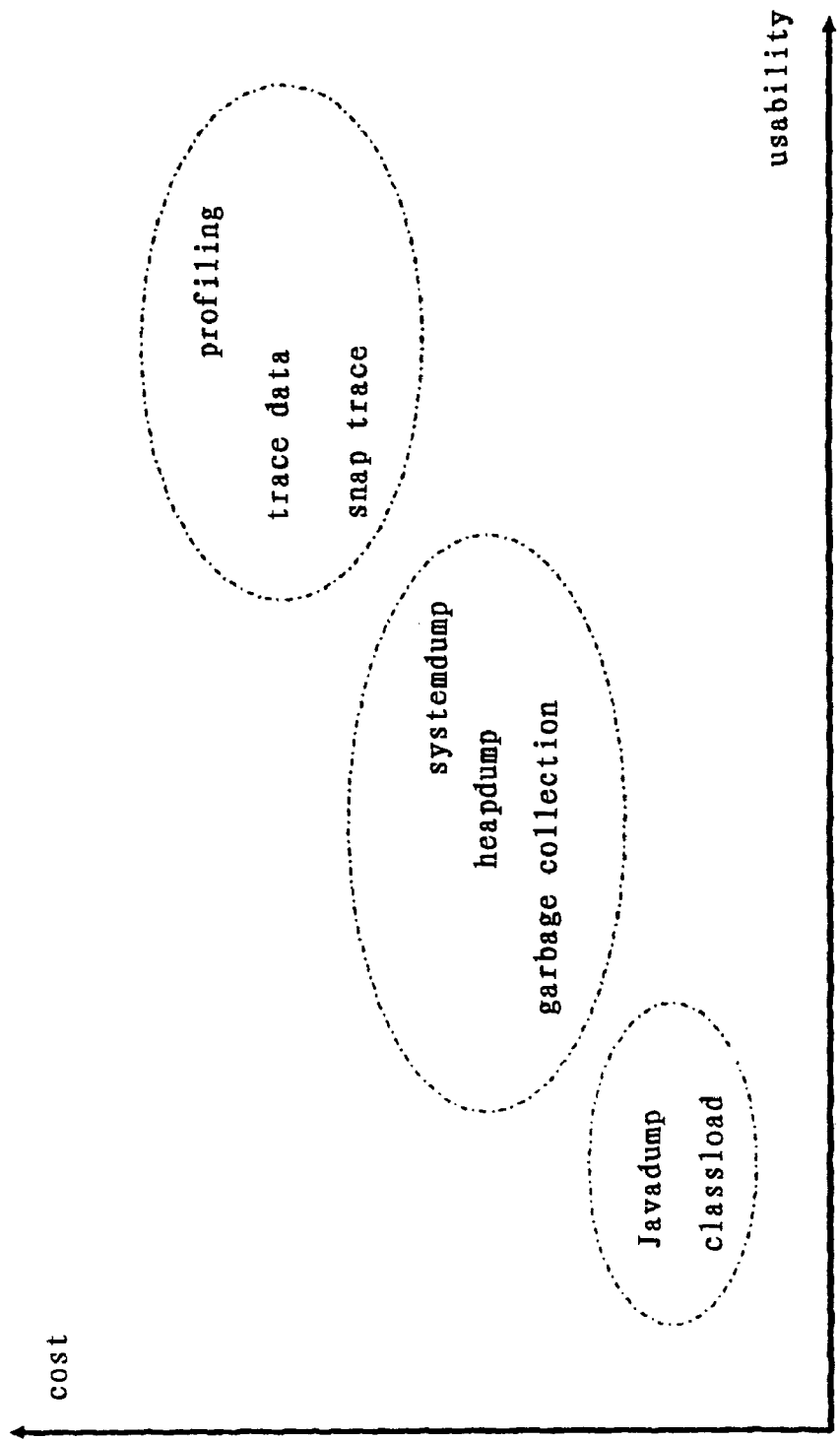
FIG. 1 illustrates the relationship between the usability of various means for problem determination and their costs.
Figure 2:
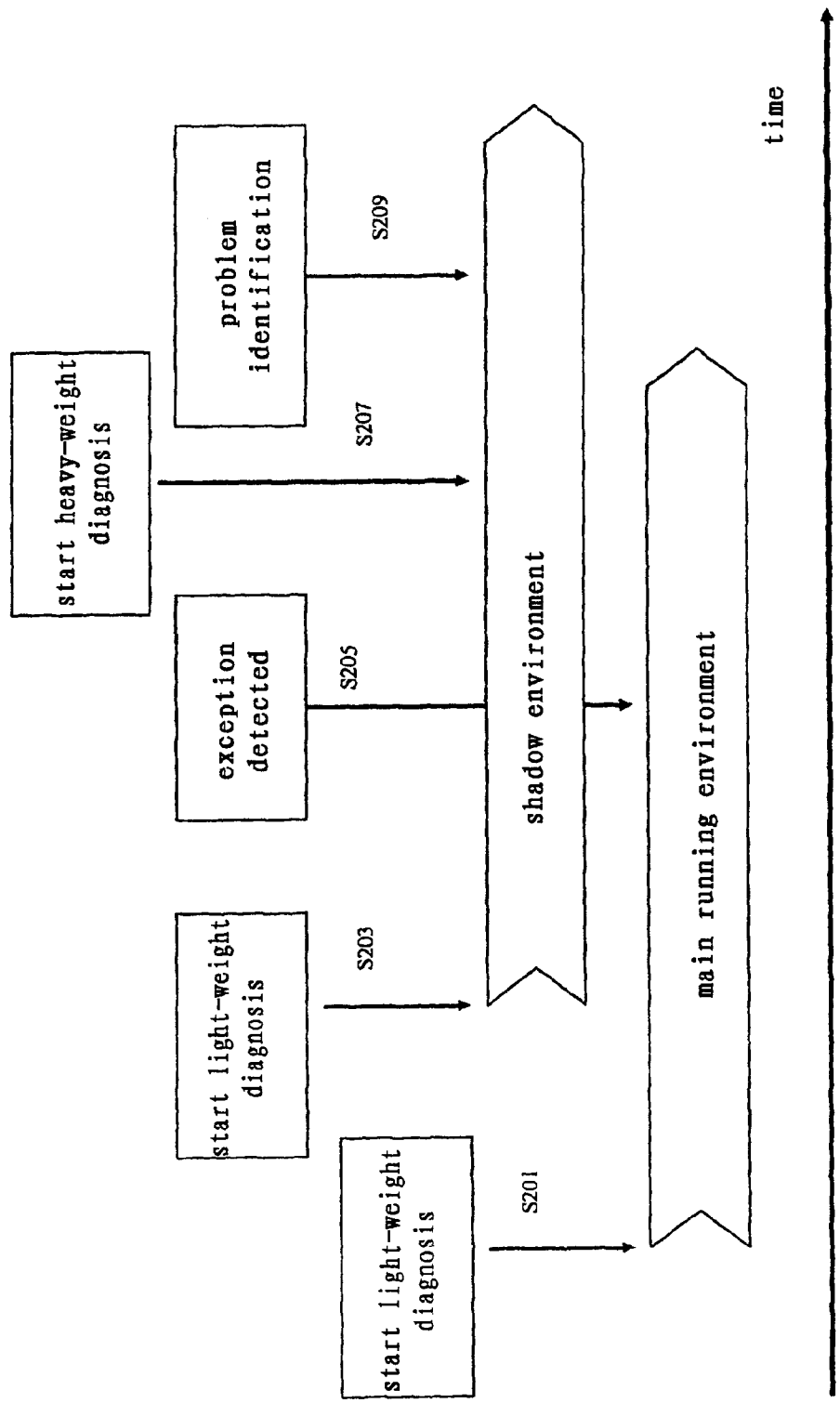
FIG. 2 schematically illustrates the principle of the present invention for diagnosing an application with environment duplication.

FIG. 2 schematically illustrates the principle of the present invention for diagnosing an application with environment duplication. The core idea of the present invention is to duplicate one or more shadow environments based on the main running environment of the application, and the shadow environment is specially used for diagnosing the fault in the application. The preferred embodiment herein will be described with respect to one shadow environment. However, those skilled in the art can appreciate that, two or more shadow environments will also solve the technical problem of the present invention and achieve the corresponding technical effects, and those skilled in the art will need no creative effects for constructing more shadow environments based on the one shadow environment of the preferred embodiment of the present invention. When the application is run, the main running environment and its shadow environment are started respectively. At the same time, "light-weight" diagnosis is started in these two environments respectively (S201 and S203). The "light-weight" diagnosis, as used herein, refers to monitoring the status of the system based on some basic information provided by the system, to monitor the occurrence of exceptional events in the system. When a system exceptional event is detected in the main running environment (S205), it is reported to the shadow environment, and the "heavy-weight" diagnosis is started in the shadow environment (S207), and the main running environment continues to work as usual. The "heavy-weight" diagnosis, as used herein, refers to opening diagnostic log/trace functions, so as to record in detail the running information of the application server for use in diagnosis analysis. Then, in the shadow environment, application diagnosis analysis is performed based on the detailed diagnosis log/trace files obtained in the "heavy-weight" diagnosis, so as to identify the problems and adopt corresponding measures. It should be noted that, FIG. 2 illustrates the work flow of the application diagnosis system schematically but not in scale for purpose of explaining the principle of the present invention only.

Figure 3:
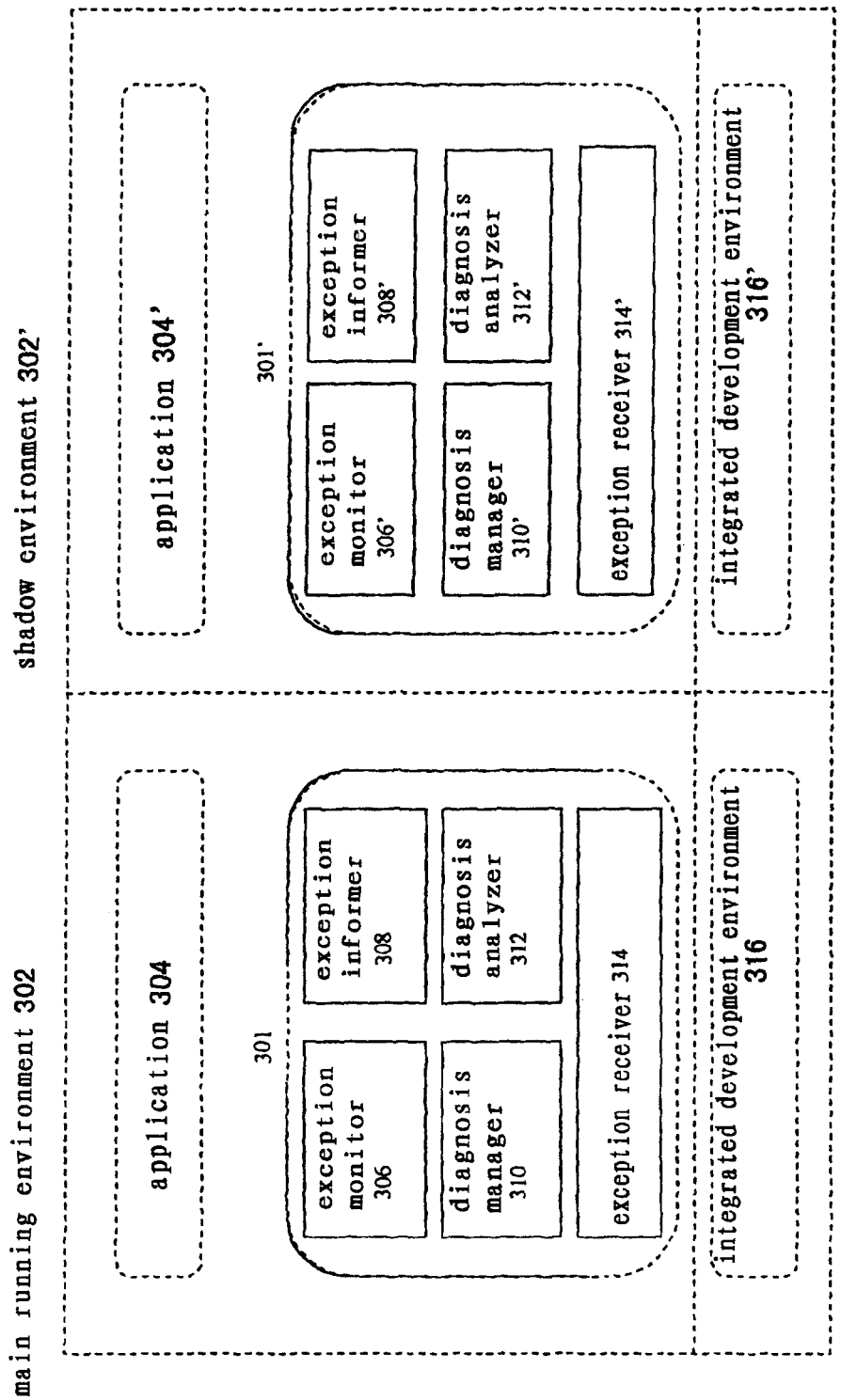
FIG. 3 illustrates the block diagram of the system capable of diagnosing an application according to the preferred embodiment of the present invention.

FIG. 3 illustrates the block diagram of system 300 for diagnosing a J2EE application according to the preferred embodiment of the present invention.

System 300 includes a main running environment 302 of J2EE application 304. The main environment 302 can be implemented on application server platforms conforming to J2EE standards, such as WebSphere application server platform of IBM Corporation (including WebSphere Application Server Version 5.X, WebSphere Application Server Version 6.X, etc.). The WebSphere application server platform is used for deploying application 304 implemented as Java server side code, and can be used on operating systems like Windows NT and Windows 2000 of Microsoft Company and can also be used on most of the variations of UNIX operating system (such as Sun Solaris, IBM AIX, HP-UX) and IBM AS/400, as a middleware between the application and the operating system. The integrated development environment 316 of the WebSphere application server platform covers the whole life cycle of the application 304 including the building, test and deployment thereof, providing a complete develop and test environment for the WebSphere application server. The integrated development environment 316 may be implemented with, for example, WSAD (WebSphere Studio Application Developer) or RAD (Rational Application Developer) from the WebSphere product family.

System 300 also includes a shadow environment 302' (or referred to as "duplicate running environment") which is specially used for application diagnosis. The shadow environment 302' is obtained by duplicating the main running environment 302. The "duplicate", as used herein, refers to deploying an identical application 304' in the same manner as that for the application 304 in the main running environment 302, based on the same WebSphere application server platform or WebBlog application server as that for the main running environment 302 (note that, the above mentioned application servers are given by way of example only, and in fact, any application server middleware may be applicable). The integrated development environment 316 and 316' in the main running environment 302 and the shadow environment 302' are not indispensable. In addition, in the preferred embodiment, the integrated development environment 316' for application 304' is identical with the integrated development environment 316 for application 304, but the present invention is not limited to this. Instead, different integrated development environments may be used to build, test and deploy application 304 and 304'. In order for application diagnosis, system 300 further includes diagnosis modules 301 and 301' arranged in the main running environment 302 and the shadow environment 302'. As will be explained in detail below, these two diagnosis modules will interact with each other with respect to the fault of the application. In fact, the main running environment 302 and the shadow environment 302' may include more than one diagnosis module, respectively. In addition, various diagnosis modules which can interact or communicate with each other may be applied in the present invention. Preferably, diagnosis modules 301 and 301' include the following sub-modules, respectively: exception monitors 306 and 306', exception informers 308 and 308', exception receivers 314 and 314', diagnosis managers 310 and 310', and diagnosis analyzers 312 and 312'. It is worth noting that, since the shadow environment 302' is a duplication of the main running environment 302, the diagnosis module 301' as shown in FIG. 3 includes sub-modules 306'-314' identical with sub-modules 306-314 in the diagnosis module 301. However, in the process of application diagnosis, the sub-modules which function in the main running environment 302 and in the shadow environment are different. In the embodiment as shown in FIG. 3, the sub-modules participating in the application diagnosis include the exception monitor 306 and exception informer 308 in the main running environment 302, and the exception receiver 314', diagnosis manager 310' and diagnosis analyzer 312', and other sub-modules do not participate in the application diagnosis. In addition, although sub-modules having relatively independent functions are given in the above examples, in fact, the above sub-modules can be combined. For example, the diagnosis manager (310, 310') and the diagnosis analyzers (312, 312') can be combined as diagnosis manager-analyzers, for managing the system exception information and performing fault analysis and diagnosis on the application.

Of course, this is from the perspective of describing the present embodiment. In practical use, since the two running environment 302 and 302' are identical, any one of the two environments can serve as the main running environment, and another environment will serve as the "shadow" environment of the main running environment. In the case where the environment 302' in FIG. 3 serves as the main running environment while the environment 302 serves as its shadow environment, the sub-modules participating in the application diagnosis include the exception monitor 306' and exception informer 308' in the environment 302', and the exception receiver 314, diagnosis manager 310 and diagnosis manager 312 in the environment 302.

The exception monitor 306 in the diagnosis module 301 is used for monitoring the status of the system, so as to monitor the occurrence of the system exceptional events. For example, when there is exception information in the system log files, such as SystemErr.log, the exception monitor 306 analyzes the error message to identify the error type. The exception informer 308 is used for sending the exception information detected by the exception monitor 306 together with the identified error type to the shadow environment 302'. The exception receiver 314' in the diagnosis module 301' in the shadow environment 302' is used for communicating with the exception informer 308 in the main running environment 302, and receives the exception information from the exception informer 308. The diagnosis manager 310' is used for, based on the system exception information received by the exception receiver 314', opening the diagnostic log/trace functions related thereto, so as to obtain the diagnosis log/trace files related to the system exception. The diagnosis analyzer 312' is used for analyzing the diagnosis result based on the diagnosis log/trace files obtained by the diagnosis manager 310'.

Figure 4:
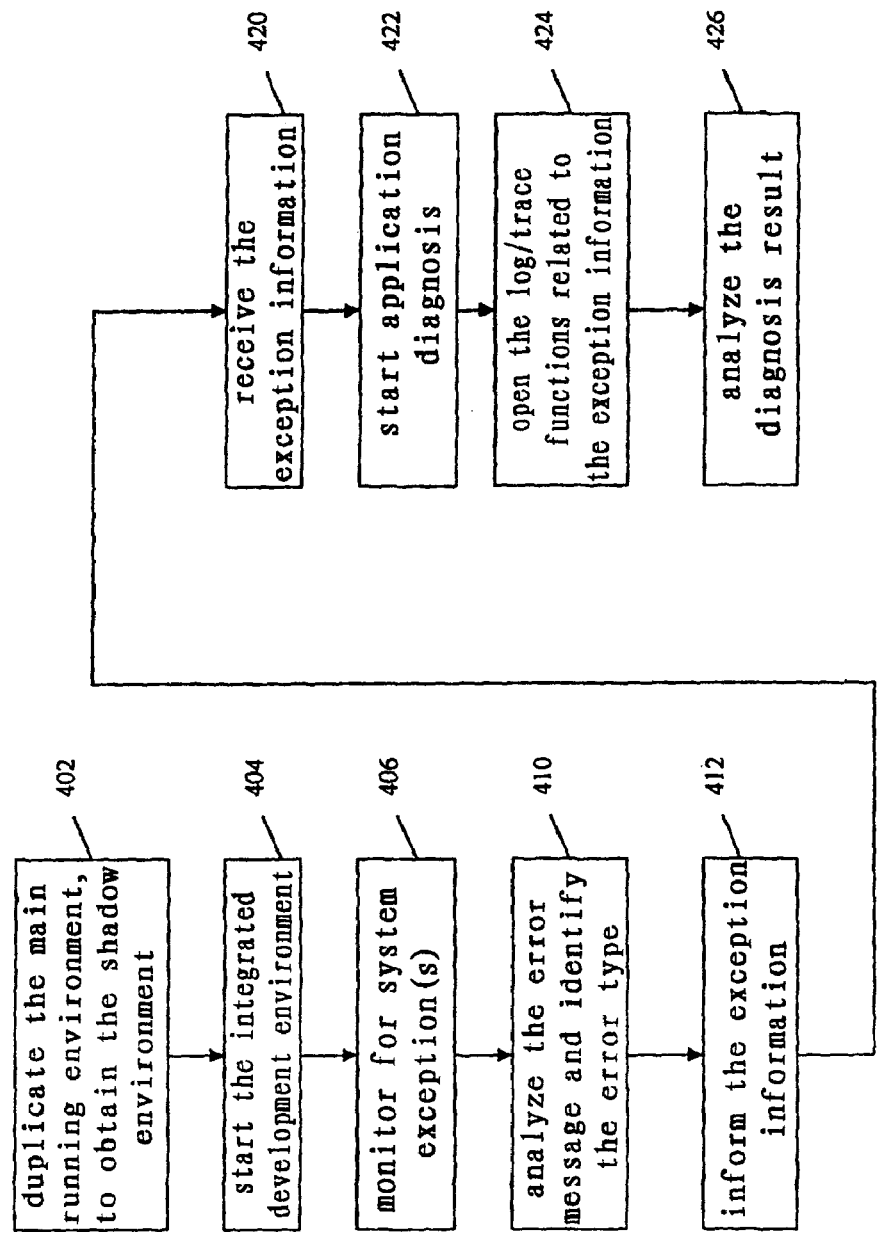
FIG. 4 illustrates the flow chart of the method for diagnosing an application according to the preferred embodiment of the present invention.

FIG. 4 illustrates the flow chart of the method 400 for diagnosing an application according to the preferred embodiment of the present invention.

First, at step 402, the main running environment 302 of the application 304 is duplicated, thereby obtaining a shadow environment 302' used for fault diagnosis of the application. According to the preferred embodiment, the shadow environment 302' includes an integrated development environment 316' which is identical with the integrated development environment 316 in the main running environment 302, and an application 304' deployed thereon, which is identical with the application 304 in the main running environment 302.

In step 404, the integrated development environments 316 and 316' in the main running environment 302 and the shadow environment 302' are started.

In step 406, the exception monitor 306 in the main running environment 302 monitors the system for exceptional events, for example, lack of memory, overflow of stack, break of threads, deadlock of threads, inability to locate designated file, input/output processing error, database processing error, and so on. As an example, the exception monitor 306 may monitor the occurrence of exceptional events by monitoring the system log files. In runtime, WebSphere application server writes the system messages into some basic log files. There log files may include, for example, JVM(standard) log, which is created by redirecting the System.out and System.err streams of JVM into separate log files. WebSphere application server writes formatted messages into System.out stream. In addition, the application and other codes may write these streams, which can be implemented by print( ) and println( ) methods defined by the streams. By default, the log files created by redirection are stored as <WAS_HOME>logs/<server_name>/SystemOut.log file and <WAS_HOME>logs/<server_name>/SystemErr.log file. The System.Out log is used for monitoring whether the status of the running WebSphere application server is normal, and the System.Err includes abnormal stack information. The basic format of a log entry may be, for example:

<time stamp><thread ID><component><event type><message ID><message>.

When the exception monitor 306 finds in step 406 that there is exception information in the system log file, e.g., SystemErr.log file, the exception monitor 306, in step 410, analyzes the error message and identifies the error type by, for example, keywords match.

In step 412, the exception informer 308 in the main running environment 302 sends the exception information detected by the exception monitor 306 together with the error type to the shadow environment 302'. The exception receiver 314' in the shadow environment 302' is used for receiving the exception information and the identified error type. According to this preferred embodiment, the exception informer 308 in the main running environment 302 communicates with the exception receiver 314' in the shadow environment 302' by means of TCP Sockets, wherein the exception receiver 314' keeps on listening certain ports in the main running environment 302 to check whether there is a connection request, and after the exception informer 308 sends a connection request, the exception receiver 314' sends back to it an acknowledgment message, thereby establishing a connection therebetween for sending the exception information. Those skilled in the art may appreciate that, the main running environment 302 may also communicate with the shadow environment 302' in any other suitable manners.

Next, in step 422, the diagnosis manager 310' in the shadow environment 302' starts application diagnosis.

In step 424, the diagnosis manager 310', according to policy, automatically opens a predetermined set of diagnostic log functions (such as profiling function, IBM activities log function) and/or trace functions, so as to record in detail the running information related to the received system exception information. This may be performed by opening log/trace functions through JMX invocation or by opening log/trace functions through system switches.

In step 426, the diagnosis analyzer 312' in the shadow environment 302' analyzes the diagnosis result based on the diagnosis log/trace files obtained by the diagnosis manager 310'. The diagnosis analyzer 312' may be implemented with the log analyzer provided by the WebSphere application platform. The log analyzer is a graphical user interface (GUI) tool, which can read one or more logs/traces, combine all the data and display the log/trace entries in turn. Preferably, the diagnosis tool carries a XML database, i.e., "Symptom database", which includes the information string, reasons for the error and recovery steps for some common problems. The log analyzer can automatically compare each error record in the diagnosis log/trace files with the collection of known problems in the symptom database, and display the matched entries. Therefore, the user may obtain information about the explanations of the error messages, the reasons for the error, and how to recover the errors.

Whereby, the present invention provides an application diagnosis method and system with environment duplication. The present invention can be implemented with hardware, software or the combination of both. In preferred embodiments, the present invention is implemented in software, which includes but is not limited to firmware, microcode, and resident software, etc.

Moreover, the present invention may be embodied as computer program product, and can be accessed from computer readable medium. The computer readable medium provides program code for use in conjunction with computers or any other instruction executing systems. The computer readable medium may be electronic, magnetic, optical, electromagnetic, infra and semiconductor devices. The specific examples of computer readable medium include semiconductor or solid memory, magnetic tape, removable disk, random access memory (RAM), read only memory (ROM), hard disk and optical disk. The current examples of optical disk include CD-ROM, CD-R/W, and DVD, etc.

Heretofore, the present invention has been explained in detail in conjunction with specific embodiments. However, the detailed description of the preferred embodiment is only for purpose of illustration and shall not be understood as limiting the invention. For example, the present invention has been described in conjunction with the WebSphere application server of IBM Corporation. However, those skilled in the art may appreciate that, the present invention is not limited to this, rather, other application servers conforming to J2EE standards, for example, WebLogic application server platform of BEA Company, etc., may also be applied. Moreover, the present invention is not limited to J2EE either, but can be applied to application development and test procedures based on integrated development environment conforming to any industrial standards.

Those skilled in the art may make various modifications and changes without departing the spirit and scope of the present invention. The protection scope of the present invention shall be defined by the claims appended.

The invention claimed is:

1. A system for diagnosing an application comprising:
   diagnosis modules in a main running environment of the application; and
   diagnosis modules in at least one shadow environment of the application, the at least one shadow environment being obtained by duplicating the main running environment,
   wherein the diagnosis modules in the main running environment and the diagnosis modules in the at least one shadow environment may interact with each other with respect to a fault of the application;
   wherein:
   the diagnosis modules in the main running environment include:
   an exception monitor for monitoring occurrence of exceptions in the system; and an exception informer for sending system exception information to the at least one shadow environment in the event that the exception monitor finds system exceptions; and the modules in the at least one shadow environment include:

an exception receiver for communicating with the exception informer to receive the system exception information; and a diagnosis manager-analyzer, for managing the system exception information and performing analysis on default of the application, wherein the diagnosis manager-analyzer includes:
 a diagnosis manager for opening diagnostic log/trace functions based on the system exception information received by the exception receiver, to obtain diagnosis log/trace files related to system exceptions; and
 a diagnosis analyzer, for analyzing and producing a diagnosis result based on the diagnosis log/trace files obtained by the diagnosis manager.

2. The system for diagnosing an application according to claim 1, wherein the diagnostic log/trace functions are opened through at least one of JMX invocation and system switches.

3. The system for diagnosing an application according to claim 1, wherein the system conforms to J2EE standards, and the main running environment and the at least one shadow environment are implemented on one of a WebSphere application server platform and a WebLogic application server platform.

4. The system for diagnosing an application according to claim 1, wherein the main running environment and the at least one shadow environment are interchangeable in function.

5. A system for diagnosing an application comprising:
 diagnosis modules in a main running environment of the application; and
 diagnosis modules in at least one shadow environment of the application, the at least one shadow environment being obtained by duplicating the main running environment,
 wherein the diagnosis modules in the main running environment and the diagnosis modules in the at least one shadow environment may interact with each other with respect to a fault of the application;
 wherein:
 the diagnosis modules in the main running environment include:
   an exception monitor for monitoring occurrence of exceptions in the system; and
   an exception informer for sending system exception information to the at least one shadow environment in the event that the exception monitor finds system exceptions; and
 the modules in the at least one shadow environment include:
   an exception receiver for communicating with the exception informer to receive the system exception information; and
 a diagnosis manager-analyzer, for managing the system exception information and performing analysis on default of the application,
 wherein the exception monitor monitors occurrence of system exceptions through monitoring basic system log files.

6. The system for diagnosing an application according to claim 5, wherein the communication between the exception informer in the main running environment and the exception receiver in the at least one shadow environment is Sockets communication.

7. The system for diagnosing an application according to claim 5, wherein the main running environment and the at least one shadow environment are interchangeable in function.

8. The system for diagnosing an application according to claim 5, wherein the system conforms to J2EE standards, and the main running environment and the at least one shadow environment are implemented on one of a WebSphere application server platform and a WebLogic application server platform.

9. A method for diagnosing an application comprising steps of:
 running the application in a main running environment and at least one shadow environment, the at least one shadow environment being obtained by duplicating the main running environment; and
 the main running environment interacting with the at least one shadow environment with respect to a fault of the application, wherein the interacting includes exchange of system exception information,
 wherein the main running environment sends the system exception information to the at least one shadow environment, and the at least one shadow environment performs diagnosis on default of the application; and
 wherein the interaction between the main running environment and the at least one shadow environment includes:
 performing the following steps in the main running environment:
 monitoring occurrence of exceptions in the system; and
 sending system exception information to the at least one shadow environment in the event of finding system exceptions; and
 performing the following steps in the at least one shadow environment:
 receiving from the main running environment the system exception information; and
 performing analysis and diagnosis on default of the application based on the received system exception information by steps of:
 opening diagnostic log/trace functions, to obtain diagnosis log/trace files related to the system exceptions; and
 analyzing and producing a diagnosis result based on the obtained diagnosis log/trace files.

10. The method for diagnosing an application according to claim 9, wherein the communication between the main running environment and the at least one shadow environment is Sockets communication.

11. The method for diagnosing an application according to claim 9, wherein the diagnostic log/trace functions are opened through at least one of JMX invocation and system switches.

12. The method for diagnosing an application according to claim 9, wherein the method conforms to J2EE standards, and the main running environment and the at least one shadow environment are implemented on one of WebSphere application server platform and WebLogic application server platform.

13. The method for diagnosing an application according to claim 9, wherein the main running environment and the at least one shadow environment are interchangeable in function.

14. A method for diagnosing an application comprising steps of:

running the application in a main running environment and at least one shadow environment, the at least one shadow environment being obtained by duplicating the main running environment; and the main running environment interacting with the at least one shadow environment with respect to a fault of the application, wherein the interacting includes exchange of system exception information, wherein the main running environment sends the system exception information to the at least one shadow environment, and the at least one shadow environment performs diagnosis on default of the application; and wherein the interaction between the main running environment and the at least one shadow environment includes:

performing the following steps in the main running environment:

monitoring occurrence of exceptions in the system; and sending system exception information to the at least one shadow environment in the event of finding system exceptions; and performing the following steps in the at least one shadow environment:

receiving from the main running environment the system exception information; and performing analysis and diagnosis on default of the application based on the received system exception information, wherein the occurrence of system exceptions is monitored through monitoring basic system log files.

15. The method for diagnosing an application according to claim 14, wherein the main running environment and the at least one shadow environment are interchangeable in function.

16. The method for diagnosing an application according to claim 14, wherein the method conforms to J2EE standards, and the main running environment and the at least one shadow environment are implemented on one of WebSphere application server platform and WebLogic application server platform.

* * * * *